US007366324B2

(12) United States Patent
Lee et al.

(10) Patent No.: US 7,366,324 B2
(45) Date of Patent: Apr. 29, 2008

(54) APPARATUS AND METHOD FOR SENSING A STATE OF A MOVABLE BODY

(75) Inventors: Yoon-Deock Lee, Seoul (KR); Hyun-Su Hong, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 896 days.

(21) Appl. No.: 10/646,555

(22) Filed: Aug. 21, 2003

(65) Prior Publication Data

US 2004/0234101 A1 Nov. 25, 2004

(30) Foreign Application Priority Data

May 23, 2003 (KR) ...................... 10-2003-0032782

(51) Int. Cl.
*G06K 9/00* (2006.01)

(52) U.S. Cl. ....................... 382/104; 382/107; 382/190

(58) Field of Classification Search ..................... None
See application file for complete search history.

(56) References Cited

U.S. PATENT DOCUMENTS

| | | | |
|---|---|---|---|
| 5,093,867 | A | 3/1992 | Hori et al. |
| 5,283,653 | A | 2/1994 | Citta |
| 2002/0004695 | A1 | 1/2002 | Glenn et al. |
| 2003/0048002 | A1 | 3/2003 | Francois |

FOREIGN PATENT DOCUMENTS

| | | | |
|---|---|---|---|
| EP | 1 028 395 | | 8/2000 |
| JP | 10-122871 | * | 2/1998 |

OTHER PUBLICATIONS

Chinese Journal of Scientific Instrument, vol. 17, No. 3, Jun. 1996 (with translation).

* cited by examiner

*Primary Examiner*—Bhavesh M Mehta
*Assistant Examiner*—Charles Kim
(74) *Attorney, Agent, or Firm*—The Farrell Law Firm, PC

(57) ABSTRACT

An apparatus and method for sensing a state of a movable body. According to the apparatus and method, since image information regarding a dashboard of a movable body is collected and a state of the movable body is sensed by analyzing the collected image information by means of image recognition technologies, the state of the movable body can be accurately sensed without an odometer and without a separate wire connection in the movable body. Further, when the apparatus and method are applied to a navigation system, more accurate position information and path guidance can be provided to users of the navigation system.

9 Claims, 4 Drawing Sheets

APPARATUS AND METHOD FOR SENSING A STATE OF A MOVABLE BODY

PRIORITY

This application claims priority to an application entitled "Apparatus and Method For Sensing A State Of A Movable Body" filed in the Korean Industrial Property Office on May 23, 2003 and assigned Serial No. 2003-32782, the contents of which are hereby incorporated by reference.

BACKGROUND OF THE INVENTION

1. Field of the Invention

The present invention relates to an apparatus and method for sensing a state of a movable body, and more particularly to a non-contact type state sensing apparatus and method.

2. Description of the Related Art

In general, movable bodies such as ships, airplanes and cars, have been provided with navigation systems for determining positions of the movable bodies and providing an optimum path to a desired destination. In order to determine positions of the movable bodies and provide an optimum path to a destination, the navigation systems must know the speeds of the movable bodies. Accordingly, the navigation systems have been provided with speed sensors for sensing the speeds of the movable bodies.

In general, speed sensors used in navigation systems can be classified into contact type speed sensors, which directly sense speed information by means of an odometer, and non-contact type speed sensors, which calculate a speed by means of an accelerometer.

In the contact type speed sensors, since an error of an odometer does not increase according to passage of time, a speed error is maintained at a constant level. However, in order to realize the contact type speed sensor, a circuit having speed information, which is installed inside of the car, must be connected with a speed sensor outside of the car. Therefore, the contact type speed sensor requires a complicated and costly process for installing a measurement device including the speed sensor. Further, since odometer types and circuit structures are different according to the kind of car, the installation processes may be different according to the kind of car. Therefore, additional costs may be incurred.

Since such wire connection is not necessary in the case of the non-contact type speed sensor, the installation process is not only simple, but also there are no additional costs. However, since the non-contact type speed sensor calculates a speed by integrating an output of an accelerometer, any error of the accelerometer is also integrated. Therefore, a speed error increases according to passage of time.

Further, a recently improved navigation system provides various services such as a service of "guiding a car to an adjacent gas station according to a fuel state of the car", or a service of "guiding a car to an adjacent gas station after sensing whether trouble exists or not in an engine", or a service of "enabling a car to be receive prompt service by wirelessly informing an adjacent gas station of a current position and abnormal state of the car". However, even if most of the information has been provided from the existing dashboard, sensors for sensing the current state of the movable bodies must be installed on each corresponding device of the movable bodies in order to sense the state of the movable bodies. Therefore, the costs increase.

SUMMARY OF THE INVENTION

Accordingly, the present invention has been made to solve the above-mentioned problems occurring in the prior art, and a first object of the present invention to provide a state sensing apparatus and method for a movable body which can accurately sense a state of the movable body.

It is a second object of the present invention to provide a state sensing apparatus and method for a movable body which can accurately sense a state of the movable body even without various sensors and a separate wire connection in the movable body.

It is a third object of the present invention to provide a state sensing apparatus and method for a movable body which can sense a state of the movable body by means of image information of a dashboard of the movable body.

In order to accomplish these objects, according to a preferred embodiment of the present invention, there is provided a state sensing apparatus in a movable body comprising: an image information collecting unit for collecting image information regarding a dashboard of a movable body; and an image recognition unit for analyzing the image information collected by the image information collecting unit and for sensing a state of the movable body.

In order to accomplish these objects, according to the preferred embodiment of the present invention, there is also provided a state sensing method comprising the steps of: (1) collecting image information regarding a dashboard of a movable body; and (2) analyzing the collected image information and sensing a state of the movable body.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described with reference to the accompanying drawings. In the following description of the present invention, a detailed description of known functions and configurations incorporated herein will be omitted when it may make the subject matter of the present invention unclear.

Figure 1A:
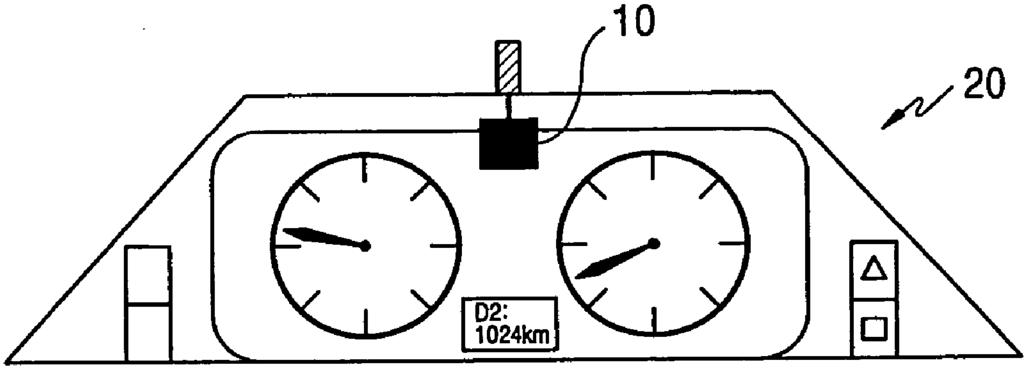
FIG. 1A and FIG. 1B are views showing an installation example of a state sensing apparatus for a movable body according to a preferred embodiment of the present invention.
Figure 1B:
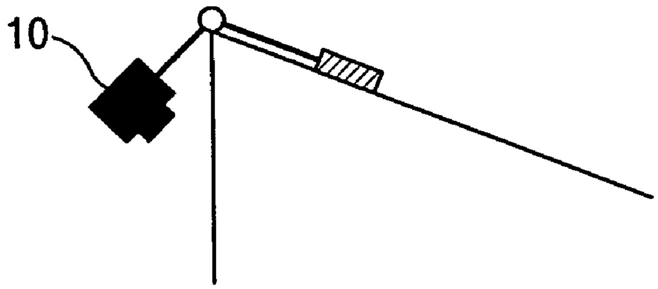

FIG. 1A and FIG. 1B are views showing an installation example of a state sensing apparatus of a movable body according to the preferred embodiment of the present invention. FIG. 1A is a front view showing an example of a state sensing apparatus of a movable body, which is installed on a front surface of a dashboard, and FIG. 1B is a side view showing an example of a state sensing apparatus of a movable body, seen from a side of a dashboard.

Referring to FIG. 1A and FIG. 1B, the state sensing apparatus for the movable body according to the embodiment of the present invention includes a miniature camera 10 installed on a front surface of a dashboard 20. The miniature camera 10 is spaced a predetermined distance away from the dashboard 20 and collects image information of the dashboard 20. Herein, miniature camera 10 collects image information including state information of the movable body.

Figure 2:
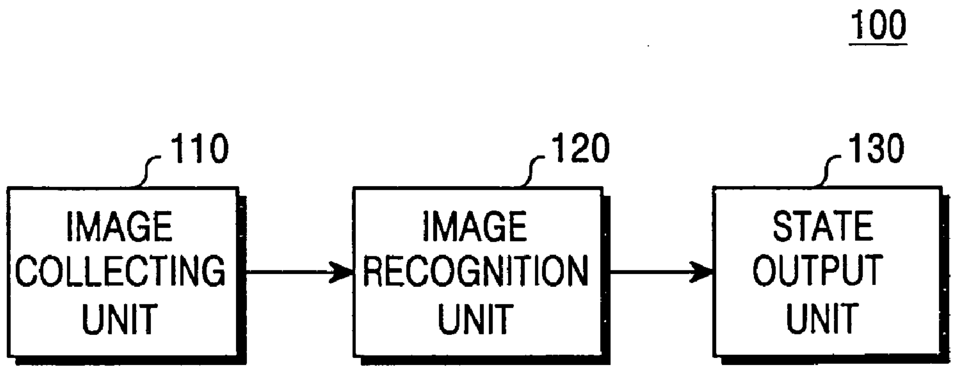
FIG. 2 is a block diagram of the state sensing apparatus for the movable body according to the embodiment of the present invention.

FIG. 2 is a block diagram of the state sensing apparatus for the movable body according to one embodiment of the present invention.

Referring to FIG. 2, the state sensing apparatus of the movable body according to the preferred embodiment of the present invention includes an image collecting unit 110, an image recognition unit 120 and a state output unit 130.

The image collecting unit 110 collects various image information regarding the dashboard 20 of the movable body. A representative example of the image collecting unit 110 is the miniature camera 10 shown in FIG. 1A and FIG. 1B.

The image recognition unit 120 analyzes the image information collected by the image collecting unit 110 and then senses the state of the movable body. Herein, the state of the movable body, which can be sensed, includes all information shown in a dashboard of a movable body, such as remaining fuel level and normality or abnormality of operation. For instance, when cars need refueling, most cars enable drivers to recognize this fact through a gas alarm lamp on a dashboard. Recently, cars can inform a driver of operation state of various electronic devices installed through the dashboard. In order to sense above-mentioned various states of the movable body, the image recognition unit 120 utilizes known image recognition technologies such as appearance-based recognition technology or feature-based recognition technology.

Figure 4A:
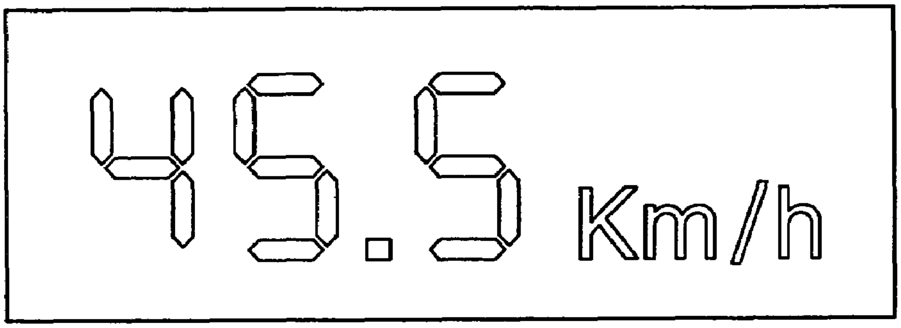
FIGS. 4A and 4B are exemplary views regarding a conventional dashboard of a car.
Figure 4B:
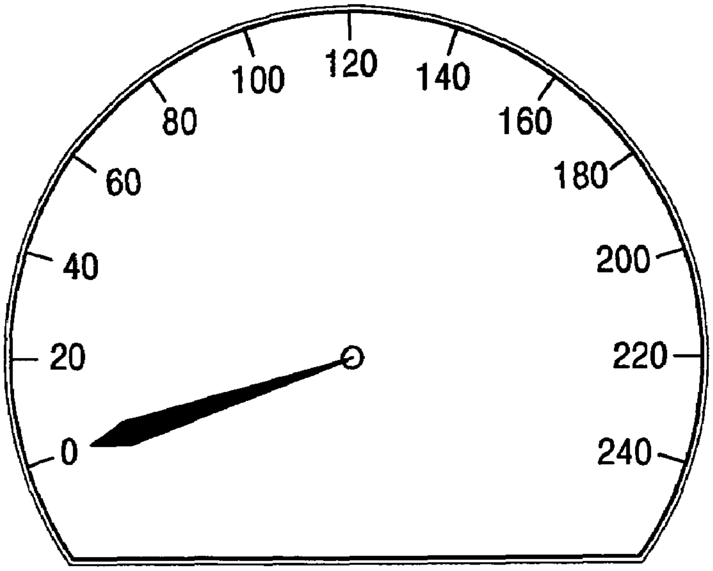

It is preferred that an image recognition technology used in the image recognition unit 120 is differently employed according to the kinds of dashboards or according to methods for outputting a state of a movable body. For instance, when the kinds of dashboards are classified into a digital type as shown in FIG. 4A and an analog type as shown in FIG. 4B, it is preferred that the digital type dashboard employs the appearance-based recognition technology. Also, it is preferred that the analog type dashboard employs the feature-based recognition technology.

Specifically, in the case of the digital type dashboard, since numerals shown in the dashboard must be recognized, it is preferred to employ the appearance-based recognition technology, which compares reference image data of numerals representing a speed with image data taken by a camera, and then recognizes the numerals. In the case of the analog type dashboard, since a rotation angle of a needle representing a speed must be recognized, it is preferred to employ feature-based recognition technology, which extracts a position of the needle point or a direction which is indicated by the needle, and then recognizes the rotation angle.

Representative examples of the appearance-based recognition technology are an auto-correlation technology and a technology using a neural network, and representative examples of the feature-based recognition technology are an edge detection technology and a curve fitting technology.

The image recognition unit 120 senses the state of the movable body from the image information of the dashboard by means of such image recognition technologies. The state output unit 130 outputs the state sensed by the image recognition unit 120 to an outside. For instance, when the state output unit 130 is a device which outputs speed information of a movable body, the state output unit 130 outputs the speed information to a device which determines position information of the movable body, or needs the speed information of the movable body in order to calculate an optimum path, in a navigation system.

Figure 3:
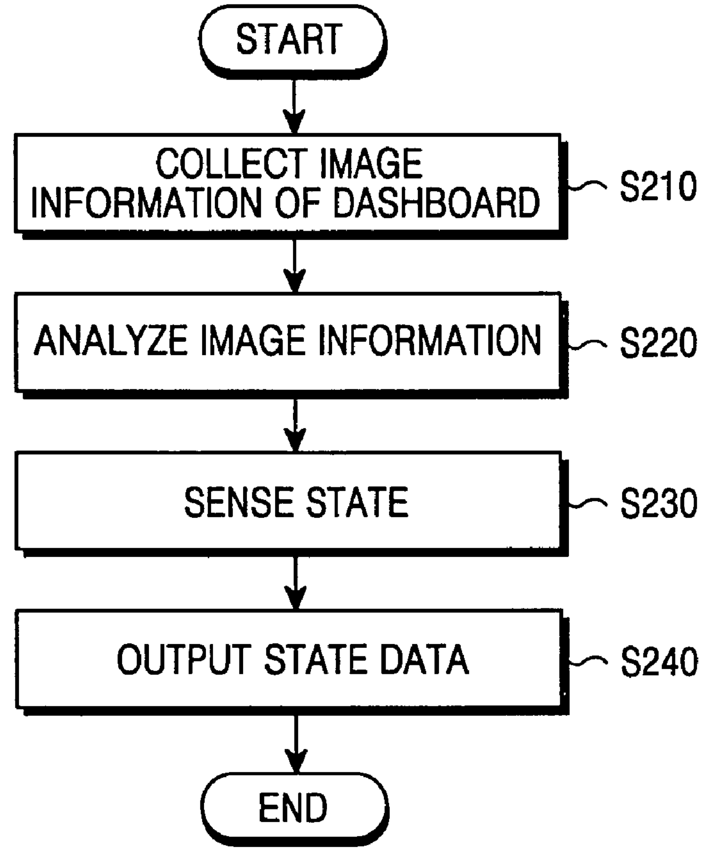
FIG. 3 is a flow chart illustrating the state sensing method for the movable body according to the preferred embodiment of the present invention.

FIG. 3 is a flow chart for illustrating the state sensing method for the movable body according to one embodiment of the present invention.

The state sensing method of the movable body according to the preferred embodiment of the present invention is described with reference to FIG. 3. First, in order to sense the state of the movable body according to the preferred embodiment of the present invention, the image information of the dashboard is collected at step S210 using the miniature camera 10 installed on a front surface of a dashboard 20 as shown in FIG. 1A and FIG. 1B. Further, the image information of the dashboard is analyzed by means of known image recognition technologies at step S220, the state of the movable body is sensed at step S230, and then the state data is outputted at step S240. Herein, since the example of image recognition technology used in the steps has been already described with reference to FIG. 2, a further description of image recognition technology is omitted.

Figure 5:
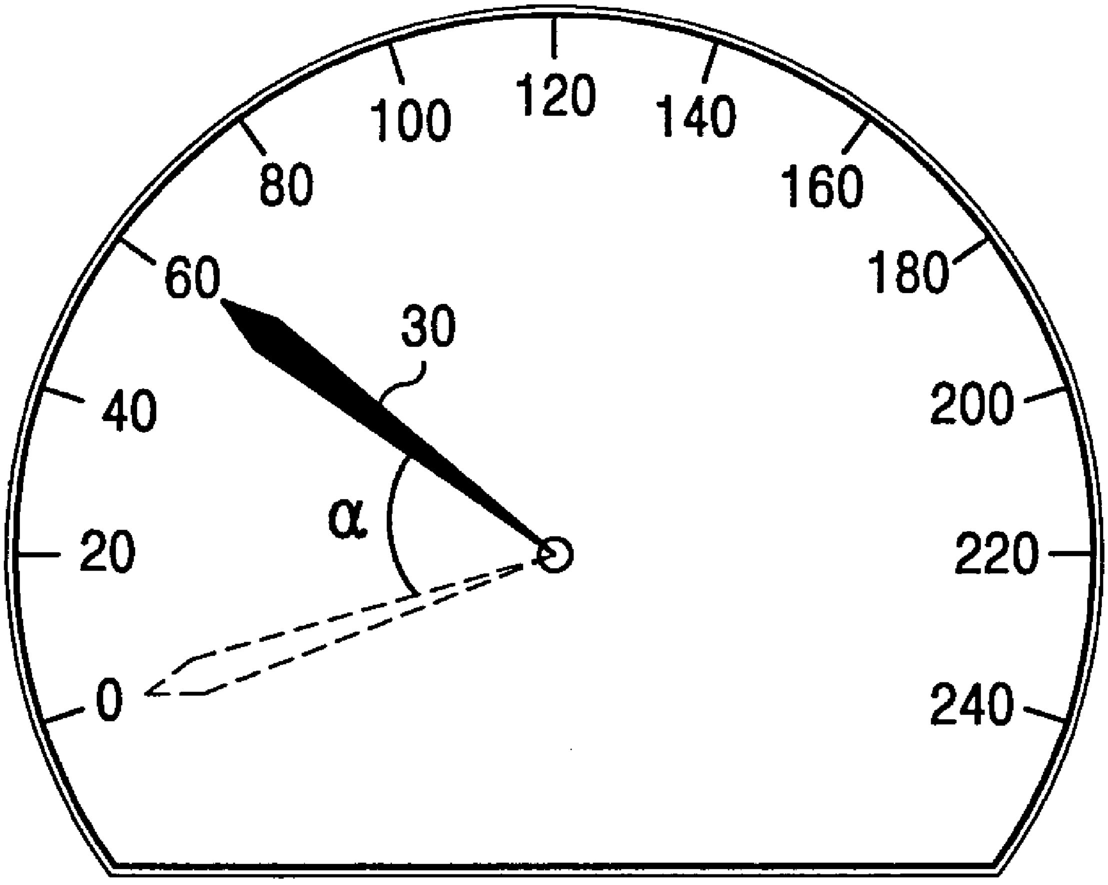
FIG. 5 is a view illustrating a method for sensing a state from an image for an analog dashboard according to the preferred embodiment of the present invention.

FIG. 5 is a view illustrating a method for sensing a speed from an image of an analog dashboard according to one embodiment of the present invention.

FIG. 5 is a view illustrating an example of a method for sensing a speed by using rotation information of an analog dashboard needle 30. Referring to FIG. 5, in sensing the speed by means of the rotation information of the analog dashboard needle 30, position information in which the dashboard needle 30 has rotated is detected from image information collected by a miniature camera. Further, a rotation angle $\alpha$ to a position of the detected needle 30 from a rest position of the needle (a dotted line) when a speed of a movable body is zero is calculated. Then, the speed of the movable body is sensed by means of the calculated angle $\alpha$. Herein, in calculating the rest position of the needle (a dotted line) and the rotation angle of the needle 30 detected from the image information, the angle $\alpha$ of clockwise rotation from the rest position of the needle is calculated.

It is preferred that a speed sensing apparatus has already stored speed information in accordance with a rotation angle of a needle, in order to sense the speed of the movable body by means of the rotation information of the analog dashboard needle 30, as the example in FIG. 5. For instance, it is preferred that the speed sensing apparatus has already stored the speed information of the movable body in accordance with the rotation angle of the dashboard needle 30 such as "when the rotation angle of the needle is 10°, the speed of the movable body is 20 km/h" or "when the rotation angle of the needle is 20°, the speed of the movable body is 40 km/h", and then determines the speed of the movable body according to the rotation angle of the needle 30 detected from image information of the dashboard by means of the image recognition technologies.

Further, in order to sense the speed of the movable body by means of the rotation information of the analog dashboard needle 30, it is possible for a speed sensing apparatus to store maximum speed information of the dashboard and a rotation angle of the dashboard needle when the speed is at a maximum, and sense the speed of the movable body by means of a ratio between a current rotation angle of the needle (that is, a rotation angle detected from image information) and the rotation angle of the dashboard needle when the speed is at a maximum. For instance, when the maximum speed of the dashboard is 'MAX_speed', the rotation angle of the dashboard needle is 'MAX_α' and the rotation angle of the needle 30 detected from the image information of the dashboard by means of the image recognition technologies is 'α', the speed of the movable body SPEED can be calculated using the following equation 1.

$$\text{SPEED} = \frac{\alpha}{\text{MAX\_}\alpha} \times \text{MAX\_speed} \qquad \text{Equation 1}$$

Also, in the case of a digital dashboard, speed information can be detected through an analysis of image information utilizing known image recognition technologies. Accordingly, a description regarding methods for detecting the speed information from the digital dashboard is omitted.

According to the present invention as described above, since state information of a movable body displayed on a dashboard is recognized by means of image recognition technologies, the state of the movable body can be accurately sensed even without various sensors and a separate wire connection for the movable body. Furthermore, when the present invention is applied to a navigation system, more accurate position information and path guidance can be provided to users of the navigation system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A state sensing apparatus for a movable body, the state sensing apparatus comprising:

an image information collecting unit for collecting image information regarding a dashboard of a movable body; and an image recognition unit for analyzing the collected image information by means of a feature-based image recognition, and for sensing a state of the movable body by analyzing a ratio between a value of an object in the image information corresponding to a current state and a value an object in the image information corresponding to a maximum state.

2. The state sensing apparatus for a movable body as claimed in claim 1, wherein the image information collecting unit is installed at a position a predetermined distance away from a front surface of the dashboard of the movable body.

3. The state sensing apparatus for a movable body as claimed in claim 1, wherein the image information collecting unit is a miniature camera.

4. The state sensing apparatus for a movable body as claimed in claim 1, wherein the maximum state is stored in the image recognition unit.

5. The state sensing apparatus for a movable body as claimed in claim 4, wherein the state is a speed of the movable body and the value of the object is a rotation angle by which a needle of an analog dashboard is rotated from a position representing a speed of zero.

6. A state sensing method for a movable body, the state sensing method comprising the steps of:

collecting image information regarding a dashboard of a movable body; and analyzing the collected image information by means of a feature-based image recognition, and sensing a state of the movable body by analyzing a ratio between a value of an object in the image information corresponding to a current state and a value an object in the image information corresponding to a maximum state.

7. The state sensing method for a movable body as claimed in claim 6, wherein, in the collecting step, the image information regarding the dashboard of the movable body is collected from a miniature camera installed at a position a predetermined distance away from a front surface of the dashboard of the movable body.

8. The state sensing method for a movable body as claimed in claim 6, wherein the dashboard is an analog dashboard, and wherein, in the analyzing step, the state is a speed of the movable body and the value of the object is a rotation angle by which a needle of the analog dashboard has rotated from a position representing a speed of zero.

9. The state sensing method for a movable body as claimed in claim 8, wherein the maximum state is stored in the image recognition unit.

* * * * *